(12) United States Patent
Katayama et al.

(10) Patent No.: US 6,532,713 B2
(45) Date of Patent: Mar. 18, 2003

(54) JOINT STRUCTURE FOR JOINING COMPOSITE BEAM AND COLUMN

(75) Inventors: Satosi Katayama, Koube (JP); Masaharu Fukunisi, Neyagawa (JP); Hiroaki Saitou, Sijyounawate (JP); Masaaki Katou, Sijyounawate (JP); Syuuiti Gouya, Oosaka (JP); Naoki Kumon, Hirakata (JP); Satosi Nakagawa, Yawata (JP)

(73) Assignee: Matsushita Electric Works, Ltd. (JP)

( * ) Notice: Subject to any disclaimer, the term of this patent is extended or adjusted under 35 U.S.C. 154(b) by 0 days.

(21) Appl. No.: 09/823,002

(22) Filed: Mar. 30, 2001

(65) Prior Publication Data

US 2002/0007614 A1 Jan. 24, 2002

(30) Foreign Application Priority Data

Jul. 18, 2000 (JP) .................................... 2000-217387

(51) Int. Cl.⁷ .................................................. E04C 3/30
(52) U.S. Cl. ................... 52/729.1; 52/729.4; 52/731.3; 403/403; 403/382
(58) Field of Search ............... 52/729.1, 729.4, 52/730.7, 731.1, 731.3, 731.4; 403/403, 382, 187, 188

(56) References Cited

U.S. PATENT DOCUMENTS

| | | | | |
|---|---|---|---|---|
| 4,195,462 A | * | 4/1980 | Keller et al. | 52/690 |
| 4,336,678 A | * | 6/1982 | Peters | 52/729 |
| 5,301,486 A | * | 4/1994 | Taylor | 52/695 |
| 5,560,177 A | * | 10/1996 | Brightwell | 52/729.4 |
| 5,848,512 A | * | 12/1998 | Conn | 52/729.1 |
| 5,850,721 A | * | 12/1998 | Martin | 52/690 |
| 5,930,966 A | * | 8/1999 | Wood et al. | 52/364 |
| 6,209,282 B1 | * | 4/2000 | Lafrance | 52/729.1 |
| 6,061,992 A | * | 5/2000 | Vincent | 52/721.3 |

FOREIGN PATENT DOCUMENTS

| | | | | |
|---|---|---|---|---|
| DE | 3604409 | * | 12/1986 | E04F/19/04 |
| FR | 2627526 | * | 2/1988 | E04B/1/14 |
| GB | 2052596 | * | 4/1980 | E04C/3/02 |
| JP | 1-284647 | * | 5/1988 | E04B/2/94 |

* cited by examiner

Primary Examiner—Jose V. Chen
Assistant Examiner—Chi Q. Nguyen
(74) Attorney, Agent, or Firm—Rosenthal & Osha L.L.P.

(57) ABSTRACT

A joint structure for joining a composite beam and a column is disclosed. The composite beam includes an I-beam and a pair of wooden members. The joint structure includes a mortise pin provided on the composite beam and protruding beyond an outer surface of one of the wooden members. The mortise pin is provided with a through-hole at a predetermined position. A bottom hole is provided at a bottom surface of the column in a manner that the bottom hole is adapted to receive the mortise pin. A horizontal hole is provided at a side face of the column at a position corresponding to the through-hole of the mortise pin. The composite beam is connected with the column by first inserting the mortise pin into the bottom hole of the column and then inserting a locking pin into the through-hole of the mortise pin and the horizontal hole of the column such that joint of the composite beam and the column is firmly secured. A method of joining a composite beam and a column is also disclosed.

18 Claims, 5 Drawing Sheets

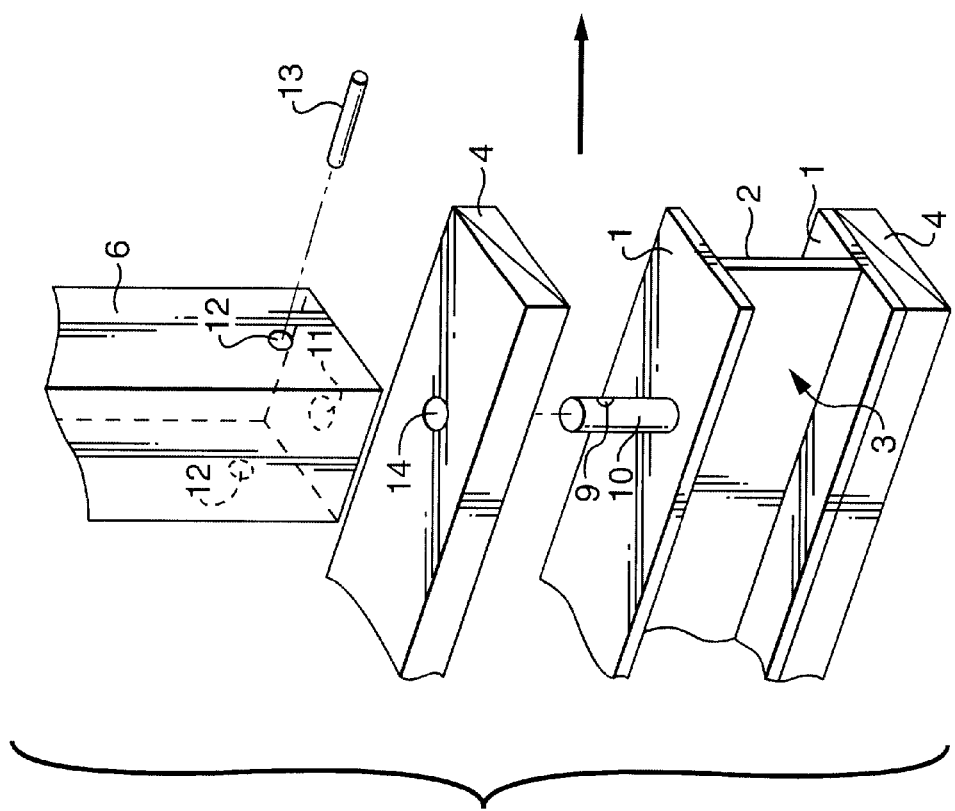
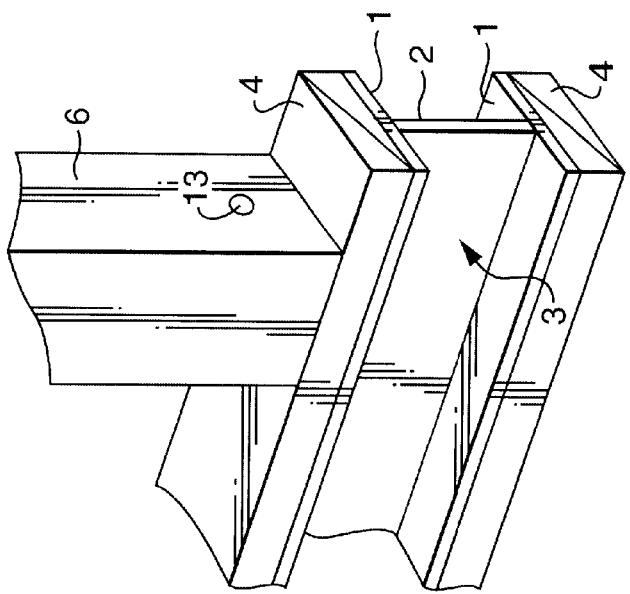

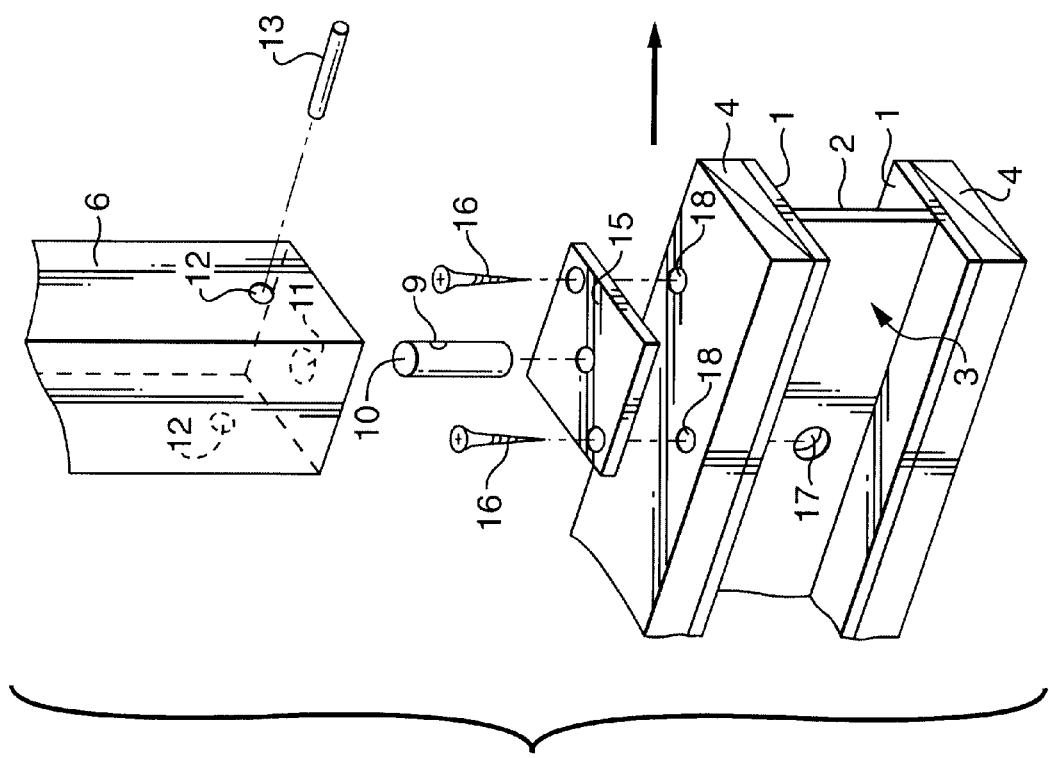

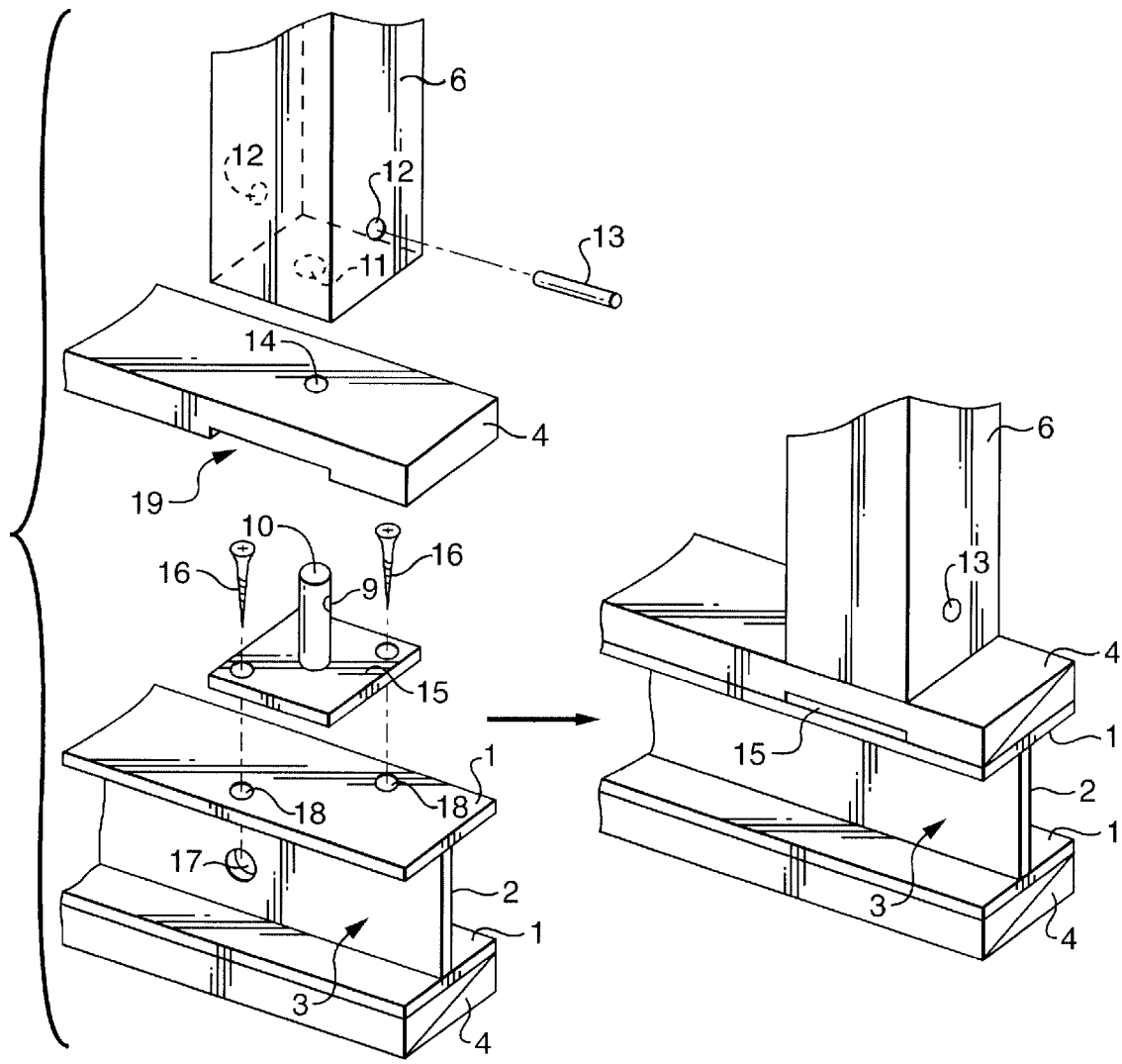
FIG. 4A
FIG. 4B
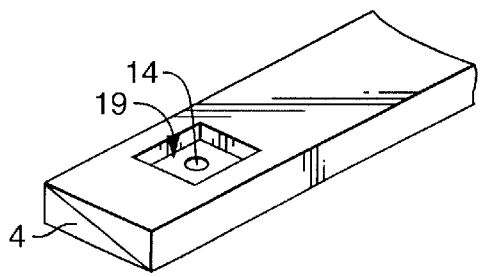
FIG. 5

JOINT STRUCTURE FOR JOINING COMPOSITE BEAM AND COLUMN

BACKGROUND OF THE INVENTION

Up to this time, wooden materials have been used for producing columns and beams and braces. These wooden components are framed together to form a building skeleton. However, in order to improve the strength, stability, and durability of the components, use of steel materials has also been considered. Applicant of this application proposed a composite beam which is formed of a steel material and a wooden material (Japanese patent laid open TOKUKAIHEI 8-13690). This composite beam is illustrated by the perspective views shown in FIG. 1a and FIG. 1b. As shown in these figures, this composite beam is formed of a steel beam (3) and a wooden member (4). The cross section of the steel beam is I-shaped. Namely, a pair of flat plate members (1) are lined in parallel and are connected each other by a perpendicular plate member (2) at the central position of the flat plate members (1). On the outer surfaces of the flat plate members (1), wooden members (4) are attached. Under this configuration, the strength, stability, and durability of the component is increased due to the use of the steel beam member (3), and the application of conventional woodworking processing to the beam becomes possible due to the attachment of the wooden members (4).

In the above-described composite beam structure, there are provided two bolts (5) for connecting the column (6) to the beam, protruding upward from the upper surface of the wooden member (4). In order to connect the columns with the beam member (3), the two bolts (5) are inserted into two holes among four holes formed at the bottom of the column (6). In addition, an H-shaped metal bracket (7) is attached across the wooden member (4) and the column (6). In order to secure the joint between the two components, the metal bracket (7) is firmly fixed to the composite beam by driving nails (8) into the wooden member (4) and the column (6) on both sides of the wooden member (4) and the column (6).

According to the above described conventional joined structure of the composite beam and column as shown in FIGS. 1a and 1b, however, one must drive the nails (8) through the bracket (7) to join the two members, making it time-consuming and labor-intensive. Also, in order for a construction worker to work efficiently, four holes need to be created at the four corners of the square bottom surface of the column (6) so that he/she does not need to find whether the column (6) is positioned in a right direction in which the two bolts (5) can be inserted into the bottom holes of the column (6). This increases the labor for processing the column (6). In addition, because the bracket (7) is fixed across the sides of the wooden member (4) and the column (6) and therefore is exposed, it is inevitable that the attached bracket (7) contacts with other surrounding components such as the metal fittings or furring strips, causing excess time and labor during construction works of the building skeleton.

SUMMARY OF THE INVENTION

In general, in one aspect, the present invention is a joint structure for joining a composite beam and a column. The composite beam comprises an I-beam and a pair of wooden members, each attached to one of two opposing flat plate members of the I-beam. The joint structure further comprises a mortise pin provided on the composite beam and protruding beyond a outer surface of one of the wooden members, which mortise pin is provided with a through-hole at a predetermined position therein, a bottom hole provided at a bottom surface of the column, which bottom hole is adapted to receive the mortise pin, and a horizontal hole provided at a side face of the column at a position corresponding to the through-hole of the mortise pin. The composite beam is connected to the column by inserting the mortise pin into the bottom hole of the column and inserting a locking pin into the through-hole of the mortise pin and the horizontal hole of the column such that the joint of the composite beam and the column is firmly secured.

In general, in another aspect, the present invention is a method of joining a composite beam and a column, which composite beam comprises an I-beam and a pair of wooden members, each attached to one of two opposing flat plate members of the I-beam. The method comprises providing a mortise pin on the composite beam such that the mortise pin protrudes beyond a outer surface of one of the wooden members, which mortise pin is provided with a through-hole at a predetermined position therein, providing a bottom hole at a bottom surface of the column, which bottom hole is adapted to receive the mortise pin, providing a horizontal hole at a side face of the column at a position corresponding to the through-hole of the mortise pin, connecting the composite beam with the column by inserting the mortise pin into the bottom hole of the column, and inserting a locking pin into the through-hole of the mortise pin and the horizontal hole of the column such that joint of the composite beam and the column is firmly secured.

BRIEF DESCRIPTION OF THE DRAWINGS

FIG. 1a is a perspective view of a disassembled prior art joint structure of a composite beam and a column showing a prior art of the present invention.

FIG. 1b is a respective view of the assembled joint structure of FIG. 1a.

FIG. 2a is a perspective view of a disassembled joint structure of a composite beam and a column showing an embodiment of the present invention.

FIG. 2b is a perspective view of the assembled joint structure of the embodiment o FIG. 2a.

FIG. 3a is a perspective view of a disassembled joint structure of a composite beam and a column showing an embodiment of the present invention.

FIG. 3b is a perspective view of an assembled joint structure of the embodiment of FIG. 3a.

FIG. 4a is a perspective view of a disassembled joint structure of a composite beam and a column showing an embodiment of the present invention.

FIG. 4b is a perspective view of an assembled joint structure of the embodiment of FIG. 4a.

FIG. 5 is a perspective view of the important part showing another form of cutout as an embodiment of the present invention.

DETAILED DESCRIPTION

Figures 1A, 1B:
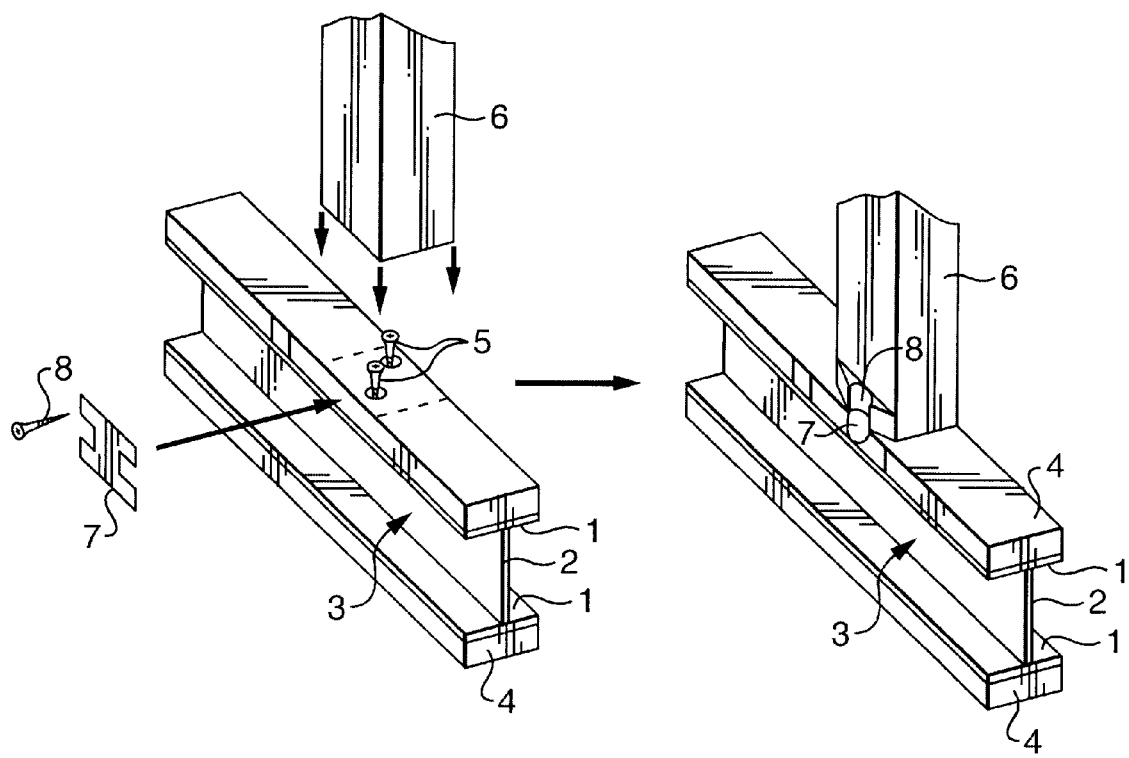

Referring now to the drawings wherein like reference characters are used for like parts throughout the several views, the present invention is explained in detail as follows.

FIGS. 2a and 2b are perspective views of the joint structure of a composite beam and column showing an embodiment of the present invention.

FIG. 2a shows a disassembled state, and FIG. 2b shows an assembled state. As shown in FIG. 2a, a metal mortise pin (10) is provided upright on a flat plate member (1) of the steel beam member (3). The metal mortise pin (10) protrudes upward beyond the upper surface of the wooden member (4) through a mortise hole (14) which is formed through the wooden member (4) at a position corresponding to the position of the metal mortise pin (10). The metal mortise pin (10) is provided with a through-hole (9). The through-hole (9) horizontally penetrates the metal mortise pin (10) in a longitudinal direction of the steel beam member (3) at a predetermined height from the surface of the flat metal plate (1). A bottom hole (11) is formed at the bottom of the column (6) having a predetermined depth in a longitudinal direction of the column (6). Also, a horizontal hole (12) is formed through the column (6) in a longitudinal direction of the steel beam member (3) at a height corresponding to the height of the through-hole (9) of the metal mortise pin (10). Under this configuration, the column (6) is connected with the composite beam by inserting the metal mortise pin (10) into the bottom hole (11). Then, a locking pin (13) is inserted into the horizontal hole (12) of the column (6) and the through-hole (9) of the metal mortise pin (10) so that the metal mortise pin (10) inserted into the bottom hole (11) is locked by the locking pin (13) at that position. For the locking pin (13), a drift-pin can be preferably used. By using a drift-pin for the locking pin (13), the locking pin (13) can be reliably inserted into the through-hole (9) of the mortise pin (10) and the horizontal hole (12) of the column (6) even when there is a slight deviation between the horizontal hole (12) of the column (6) and the through-hole (9) of the metal mortise pin (10).

Under this configuration, the composite beam (3) can be connected with the column (6) without using nails, thereby saving the labor needed to drive the nails into the composite beam and the column (6). At the same time, because the metal mortise pin (10) and the locking pin (13) are not exposed outside, the problem of hitting or contacting surrounding components caused by having the attachment, such as the bracket (7) shown in FIG. 1, is avoided. Moreover, because only a single metal mortise pin (10), mortise hole (11), and horizontal hole (12) are needed for connecting the composite beam (3) with the column (6), the labor required for processing the column (6) for connecting the components is greatly reduced. Also, because of the elimination of nailing work and the problem caused by the contact between the joint structure and other surrounding components, workability of this joint structure of the composite beam and column is greatly improved compared to the joint structure shown in FIGS. 1a and 1b.

According to the joint structure of a composite beam and a column of the present invention, there are a plurality of embodiments in connection with the methods for providing a mortise pin on the composite beam.

According to an embodiment shown in FIGS. 2a and 2b, the metal mortise pin (10) is welded onto the surface of the flat plate member (1) of the composite beam. A mortise hole (14) is formed through the wooden member (4) at a position corresponding to the metal mortise pin (10). The wooden member (4) is attached on the flat plate member (1) such that the metal mortise pin (10) protrudes beyond the upper surface of the wooden member (4) through the mortise hole (14) thereof. An advantage of this embodiment is that the metal mortise pin (10) can be easily provided on the flat plate member (1) of the steel beam member (3) by using a welding process.

According to an embodiment shown in FIGS. 3a and 3b, the metal mortise pin (10) is provided on a flat metal plate (15) in a manner that the metal mortise pin (10) is fixed standing upright on the flat metal plate (15). Then, the flat metal plate (15) is fixedly attached on the upper surface of the wooden member (4). The metal mortise pin (10) can be fixed on the flat plate metal (15) by using a welding process or by screwing bolts. In order to firmly fix the mortise pin (10) on the flat metal plate (15), screwing bolts is preferred. The flat metal plate (15) can be fixedly attached on the wooden member (4) by a method, such as nailing, using nuts and bolts. In order to firmly fix the flat metal plate (15), a bolt hole (18) is formed through the wooden member (4) and the flat plate member (1), and the bolt is inserted into this bolt hole (18) such that the top end of the bolt protrudes beyond the opposite side of the flat plate member (1). Then the protruding top end of the bolt is fixed by using a nut (17) as shown in FIG. 3a.

It is also possible that the flat metal plate (15) be directly fixed on the flat plate member (1). In this case, the metal flat plate (15) can be fixedly attached to the flat metal member (1) by a method, such as welding, using nuts and bolts. In order to firmly fix the flat metal plate (15), it is preferable that a bolt hole (18) be formed through the flat plate member (1), and thereafter the bolt is inserted into this bolt hole such that the top end of the bolt protrude beyond the opposite side of the flat plate member (1), and then the protruding top end of the bolt be fixed by using a nut (17) as shown in FIG. 3a.

According to an embodiment shown in FIGS. 4a and 4b, a mortise hole (14) is formed through the wooden member (4) at a position corresponding to the position of the metal mortise pin (10). The metal mortise pin (10) is inserted into the mortise hole (14) such that the top end of the metal mortise pin (10) protrudes beyond the upper surface of the wooden member (4), similarly to the embodiment shown in FIG. 2. In this embodiment, however, the flat metal plate (15) is positioned between the flat plate member (1) and the wooden member (4). A cutout (19) is formed at the bottom of the wooden member (4), the width and thickness of which is adjusted to that of the flat metal plate (15), such that the flat metal plate (15) can be stored in a space formed by the cutout (19).

Although the embodiment shown in FIG. 2 does not cause too much problem with regard to the contact with other surrounding components, the upper face portion of the flat metal plate (15) is exposed outside. Therefore, it is possible that the flat metal plate (15) contacts with the surrounding components. Contrary, according to the configuration of this embodiment of FIG. 4, the flat metal plate (15) is accommodated in the cutout space, not exposed outside, and therefore does not contact with other surrounding components. For this reason, this embodiment is particularly advantageous in that it can effectively avoid contact of the joint structure with other surrounding components.

According the configuration shown in FIG. 4, the cutout (19) is formed throughout the entire width of the wooden member (4). However, the cutout (19) may be formed in a manner that side edges are left uncut as shown in FIG. 5. Under such configuration, the outside view of the joint structure is almost the same as that of the embodiment shown in FIG. 2b. Because the flat metal plate (15) is not exposed to the outside, the contact of the flat metal plate (15) with the surrounding components is completely prevented.

Under the configuration of the joint structure of composite beam and column as described in the above-described embodiments, a shrinkable shock absorbing member can be provided between the bottom surface of the column (6) and the top surface of the wooden member (4) or the flat metal plate (15). For example, in the embodiment shown in FIG. 2 or 4, the shock absorbing member can be provided between the bottom surface of the column (6) and the upper surface of the wooden member (4). In the embodiment shown in FIG. 3, the shock absorbing member can be provided between the bottom surface of the column (6) and the upper surface of the flat metal plate (15).

Figures 6A, 6B:
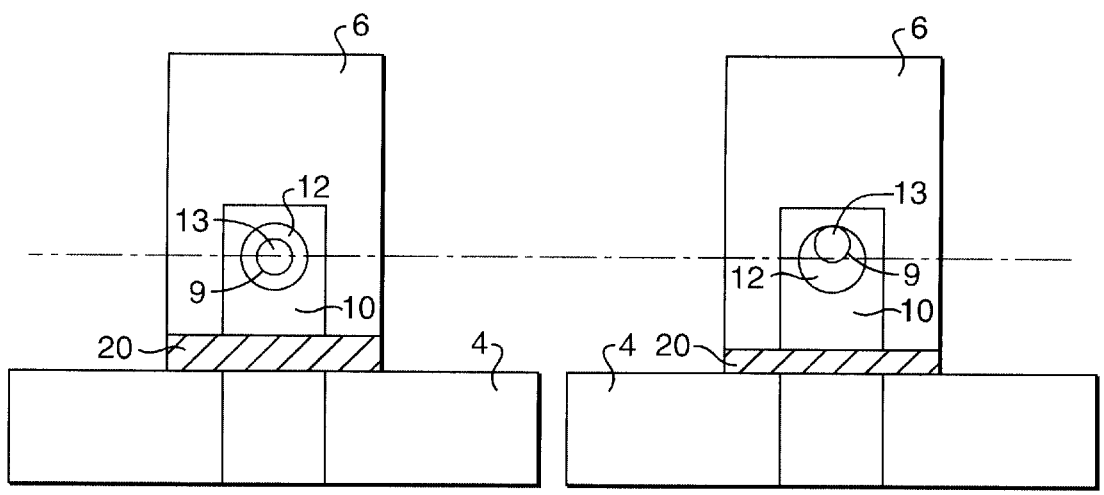
FIG. 6a is a cross-sectional view of the major part of the joint structure of a composite beam an a column wherein a shock-absorber is installed.
FIG. 6b is a cross-sectional view of the major part of the joint structure of a composite beam and a column wherein a shock-absorber is installed.

FIG. 6 shows a cross sectional view of the embodiment shown in FIG. 4 or 6 having the shock absorbing member (20) between the column (6) and the wooden member (4). Owing to cumulative imprecision of processing of the column (6) or other joint components, deviation of the relative position between the through hole (9) of the metal mortise pin (10) and the horizontal hole (12) of the column (6) may occur as shown in FIG. 6b. If the deviation between the horizontal hole (12) and the through hole (9) becomes large, it becomes difficult to insert the locking pin (13) through the horizontal hole (12) and the through-hole (9) even if a drift pin is used for the locking pin (13). If the locking pin (13) is forced into the horizontal hole (12) and the through-hole (9), there is a danger that the locking pin (13) may exert excessive force against an inside face of the horizontal hole (12) and eventually cause a crack of the column (6). As a measure to prevent such occurrence, a shrinkable shock absorbing member (20) can be provided between the bottom face of the column (6) and the upper surface of the wooden member (4) or that of the metal plate (15). By having that shrinkable shock absorbing member (20) between the two members, the deviation between the through hole (9) and the horizontal hole (12) can be effectively adjusted so that the locking pin (13) is prevented from getting lodged inside the column (6) or eventually causing crack of the column (6). Although the material which can be used for that shrinkable shock absorbing member is not restricted to any specific material, ethylene-propylene copolymer (EPDM) or styrene butadiene rubber (SBR) can be used.

While the present invention has been described with respect to a limited number of preferred embodiments, those skilled in the art will appreciate numerous modifications and variations therefrom. The appended claims are intended to cover all such modifications and variations which occur to one of ordinary skill in the art.

What is claimed is:

1. A joint structure for joining a composite beam and a column, the composite beam comprising an I-beam and a pair of wooden members, each attached to one of two opposing flat plate members of the I-beam, the joint structure comprising:
   a mortise pin provided on the composite beam and protruding beyond a outer surface of one of the wooden members, the mortise pin being provided with a through-hole at a predetermined position therein;
   a bottom hole provided at a bottom surface of the column, the bottom hole being adapted to receive the mortise pin; and
   a horizontal hole provided at a side face of the column at a position corresponding to the through-hole of the mortise pin;
   wherein the composite beam is connected with the column by inserting the mortise pin into the bottom hole of the column and inserting a locking pin into the through-hole of the mortise pin and the horizontal hole of the column such that joint of the composite beam and the column is firmly secured.

2. The joint structure according to claim 1, wherein the mortise pin is connected to an outer surface of the flat plate member by welding and protrudes beyond the outer surface of the wooden member through a mortise hole formed through the wooden member at a position corresponding to a position of the mortise pin.

3. The joint structure according to claim 1, wherein the mortise pin is provided on a flat metal plate at a position corresponding to the position of the bottom hole of the column and the flat metal plate is attached to an outer surface of the wooden member.

4. The joint structure according to claim 1, wherein the mortise pin is provided on a flat metal plate at a predetermined position, the wooden member is provided with a cutout formed at a bottom thereof and a mortise hole at a position corresponding to a position of the mortise pin, and the flat metal plate is attached to an outer surface of the flat plate member in a manner that a top end of the mortise pin provided on the flat metal plate protrudes from the outer surface of the wooden member through the mortise hole and the flat metal plate is stored in a space formed by the cutout.

5. The joint structure according to claim 4, wherein the cutout is formed in a manner that both side ends of the bottom of the wooden member is left uncut, and the flat metal plate is completely stored inside the space formed by the cutout.

6. The joint structure according to claim 2, wherein a shrinkable shock absorbing member is provided between the outer surface of the wooden member and the bottom of the column.

7. The joint structure according to claim 4, wherein a shrinkable shock absorbing member is provided between the outer surface of the wooden member and the bottom of the column.

8. The joint structure according to claim 5, wherein a shrinkable shock absorbing member is provided between the outer surface of the wooden member and the bottom of the column.

9. The joint structure according to claim 3, wherein a shrinkable shock absorbing member is provided between the outer surface of the flat metal plate provided on the wooden member and the bottom of the column.

10. A method of joining a composite beam and a column, the composite beam comprising an I-beam and a pair of wooden members, each attached to one of two opposing flat plate members of the I-beam, the method comprising:
   providing a mortise pin on the composite beam such that the mortise pin protrudes beyond a outer surface of one of the wooden members, the mortise pin being provided with a through-hole at a predetermined position therein;
   providing a bottom hole at a bottom surface of the column, the bottom hole being adapted to receive the mortise pin;
   providing a horizontal hole at a side face of the column at a position corresponding to the through-hole of the mortise pin;
   connecting the composite beam with the column by inserting the mortise pin into the bottom hole of the column; and
   inserting a locking pin into the through-hole of the mortise pin and the horizontal hole of the column such that joint of the composite beam and the column is firmly secured.

11. The method according to claim 10, further comprising connecting the mortise pin onto an outer surface of the flat plate member and forming a mortise hole through the wooden member at a position corresponding to a position of the mortise pin such that the mortise pin protrudes beyond the outer surface of the wooden member through the mortise hole.

12. The method according to claim 10, further comprising providing the mortise pin on a flat metal plate at a position corresponding to the position of the bottom hole of the column and attaching the flat metal plate onto an outer surface of the wooden member.

13. The method according to claim 10, further comprising providing the mortise pin on a flat metal plate at a predetermined position, forming a cutout at a bottom of the wooden member, forming a mortise hole through the wooden member at a position corresponding to a position of the mortise pin, and attaching the flat metal plate to an outer surface of the flat plate member in a manner that a top end of the mortise pin provided on the flat metal plate protrudes from the outer surface of the wooden member through the mortise hole and the flat metal plate is stored in a space formed by the cutout.

14. The method according to claim 13, wherein the cutout is formed in a manner that both side ends of the bottom of the wooden member is left uncut, and the flat metal plate is completely stored inside the space formed by the cutout.

15. The method according to claim 11, further comprising providing a shrinkable shock absorbing member between the outer surface of the wooden member and the bottom of the column.

16. The method according to claim 13, further comprising providing a shrinkable shock absorbing member between the outer surface of the wooden member and the bottom of the column.

17. The method according to claim 14, further comprising providing a shrinkable shock absorbing member between the outer surface of the wooden member and the bottom of the column.

18. The method according to claim 12, further comprising providing a shrinkable shock absorbing member between the outer surface of the flat metal plate and the bottom of the column.

* * * * *